United States Patent [19]

Reitz et al.

[11] Patent Number: 5,588,013
[45] Date of Patent: Dec. 24, 1996

[54] POLARIZATION CONTROLLED TUNEABLE RING LASER

[75] Inventors: Paul Reitz, Palmyra; Hatem Abdelkader, Harrisburg, both of Pa.

[73] Assignee: The Whitaker Corporation, Wilmington, Del.

[21] Appl. No.: 347,537

[22] Filed: Nov. 30, 1994

[51] Int. Cl.$^6$ .................................................. H01S 3/098
[52] U.S. Cl. .................................................. 372/19; 372/94
[58] Field of Search ...................................... 372/19, 94

[56] References Cited

U.S. PATENT DOCUMENTS

| | | | |
|---|---|---|---|
| 4,530,097 | 7/1985 | Stokes et al. | 372/94 |
| 4,923,291 | 5/1990 | Edagawa et al. | 350/389 |
| 4,949,345 | 8/1990 | Luijtjes | 372/27 |
| 4,949,358 | 8/1990 | Kantorski et al. | 372/94 |
| 5,056,096 | 10/1991 | Baker et al. | 372/6 |
| 5,132,976 | 7/1992 | Chung et al. | 372/6 |
| 5,239,607 | 8/1993 | da Silva et al. | 385/122 |
| 5,243,609 | 9/1993 | Huber | 372/19 |
| 5,274,659 | 12/1993 | Harvey et al. | 372/94 |

OTHER PUBLICATIONS

*IEEE Photonics Technology Letters*; "Electronically Tuneable Liquid–Crystal–Etalon Filter For High–Density WDM Systems"; M. W. Maeda et al. vol. 2, No. 11, Nov. 1990.
*Electronics Letters*; "Pigtailed High–Finesse Tunable Fibre Fabry–Perot Interferometers With Large, Medium and Small Free Spectral Ranges", J. Stone et al., vol. 23, Jul. 1987.

Primary Examiner—Rodney B. Bovernick
Assistant Examiner—Robert E. Wise
Attorney, Agent, or Firm—William S. Francos

[57] ABSTRACT

The present invention relates to a tuneable ring laser with an output having a fixed, stable linear state of polarization with a fixed and known azimuth. The state of polarization at the output is fixed by compensating for component birefringence of the various ring elements that alter the polarization state and azimuth.

6 Claims, 3 Drawing Sheets

POLARIZATION CONTROLLED TUNEABLE RING LASER

FIELD OF THE INVENTION

The invention of the present disclosure relates to a stable state of polarization at the output of a frequency tuneable ring laser, so as to enable a compatible signal source for polarization sensitive devices.

BACKGROUND OF THE INVENTION

This invention is related to U.S. application Ser. No. 08/347,538, TWC Docket Number 16080, filed on even date herewith. With the advent of optical fiber communications, a need has developed for relatively low cost, high efficiency and single frequency light emitting devices. Such devices allow for reliable sources with which to effect the various modulation schemes, such as frequency shift keying (FSK) and phase shift keying (PSK) as well as other WDM techniques. Ring lasers are quickly becoming a suitable light source for such applications, and strides have been made to modify and/or improve the basic ring laser to effect a desired light output. An example of such a ring laser is found in U.S. Pat. No. 5,132,976, to Chung, et al, the disclosure of which is specifically incorporated herein by reference. The '976 reference discloses the use of a fiber Fabry-Perot etalon, a F-P etalon in which two mirrors are made by depositing coatings on the polished ends of single mode fiber, to effect wavelength selectivity. The tuning of the FFP is effected by electrically controlling the gap of the etalon, and the FFP boasts a finesse of 55. The ring laser cavity includes a section of erbium doped fiber which serves to enable the gain of the ring to exceed the loss, thereby permitting lasing. Recognizing that the FFP cannot be used as a standing wave resonator as it will reflect wavelengths outside the passband and act as a resonator for those wavelengths, the invention discloses the use of an in line optical isolator. The isolator serves to suppress standing wave laser modes generated by the FFP reflections which are outside the FFP passband, allowing lasing to occur within the passband of the FFP, as desired. Finally, a polarization controller is included in the ring for the purpose of maximizing the output power. Another example of the use of a ring laser for a stable source of light at a select frequency is found in U.S. Pat. No. 5,243,609 to Huber, the disclosure of which is specifically incorporated herein by reference. The Huber reference discloses the drawbacks of the use of $Er^{3+}$ as a gain medium in a ring laser, one drawback being the existence of multiple longitudinal modes. Longitudinal modes in this instance can be close enough to one another to result in a beat manifesting in the rf range, an unacceptable result in many communications applications. The reference discloses the suppression of undesired modes that result in beating about the rf band. The reference discloses the use of a Fabry-Perot etalon as one method of suppressing undesired longitudinal modes by choosing the cavity lengths to support a selected mode(s). The reference also discloses the use of an optical isolator to ensure wave oscillation in one ring direction. Finally, a Fabry-Perot interferometer pair of unequal length provide wavelength selectivity within the ring laser.

SUMMARY OF THE INVENTION

The present invention relates to a tuneable ring laser with an output having a fixed, stable linear state of polarization with a fixed and known azimuth. The state of polarization at the output is fixed by compensating for component birefringence of the various ring elements that alter the polarization state and azimuth.

OBJECTS, FEATURES AND ADVANTAGES OF THE INVENTION

It is an object of the present invention provide a stable frequency, power and state of polarization optical signal source via a ring laser structure.

It is a feature of the present invention to use polarization maintaining fiber in a ring laser configuration in conjunction with a polarization compensating birefringent section to nullify the transformation in polarization state caused by the various components of the ring laser.

It is an advantage of the present invention that the output of the device is not only of a fixed polarization state but also of a well defined azimuthal orientation; that is, fixed with respect to the principal axes of a polarization maintaining fiber.

DETAILED DESCRIPTION OF THE PREFERRED EMBODIMENTS

Figure 1:
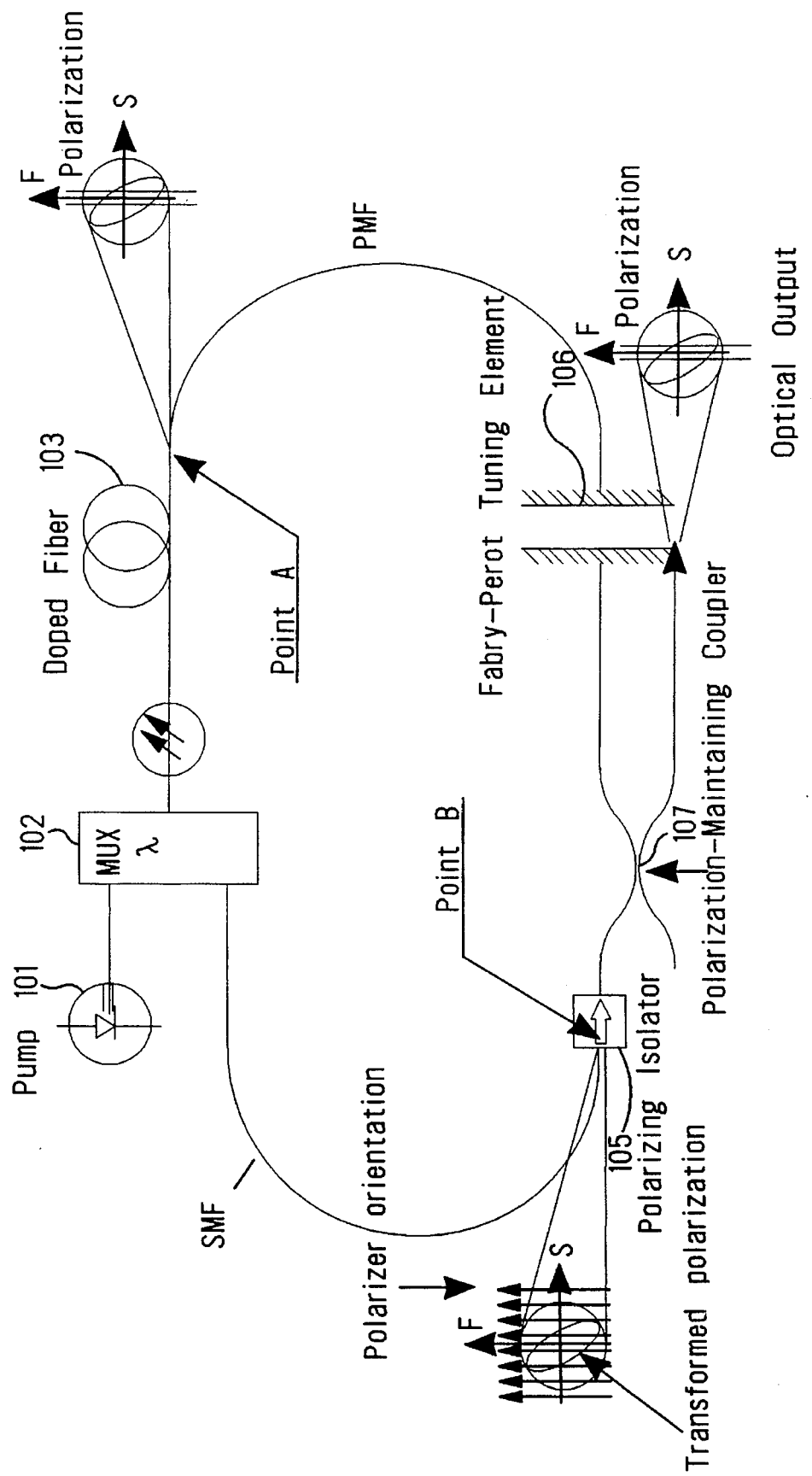
FIG. 1 is a schematic diagram of a ring laser of the with undesired polarization. The ill-effects of birefringence of the elements of the ring are shown at selected points.
Figure 2:
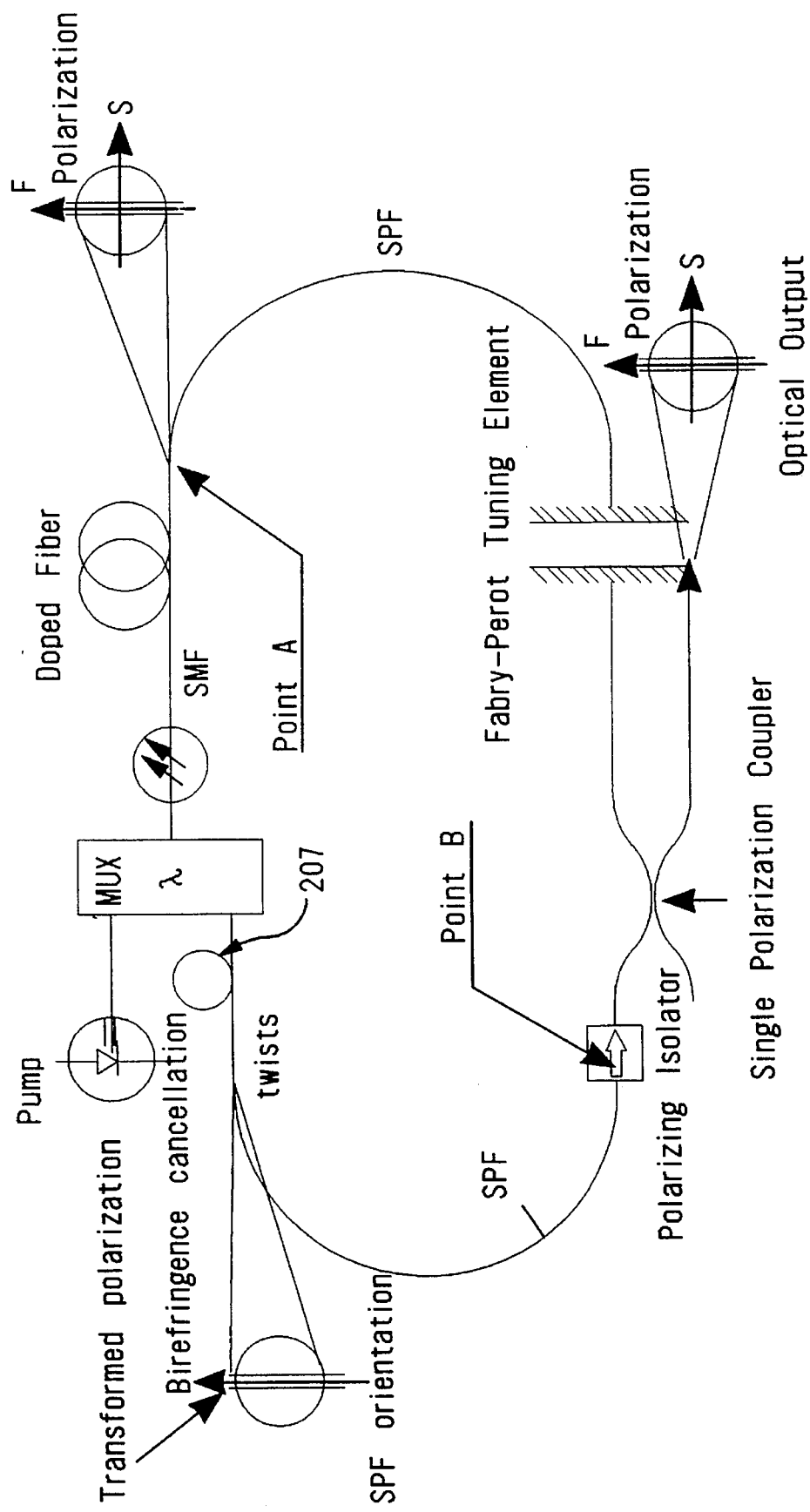
FIG. 2 is a schematic diagram of an embodiment of a ring laser instant invention using a polarizing isolator having controlled polarization. The states of polarization at selected points in the ring for an arbitrary input are shown as well.
Figure 3:
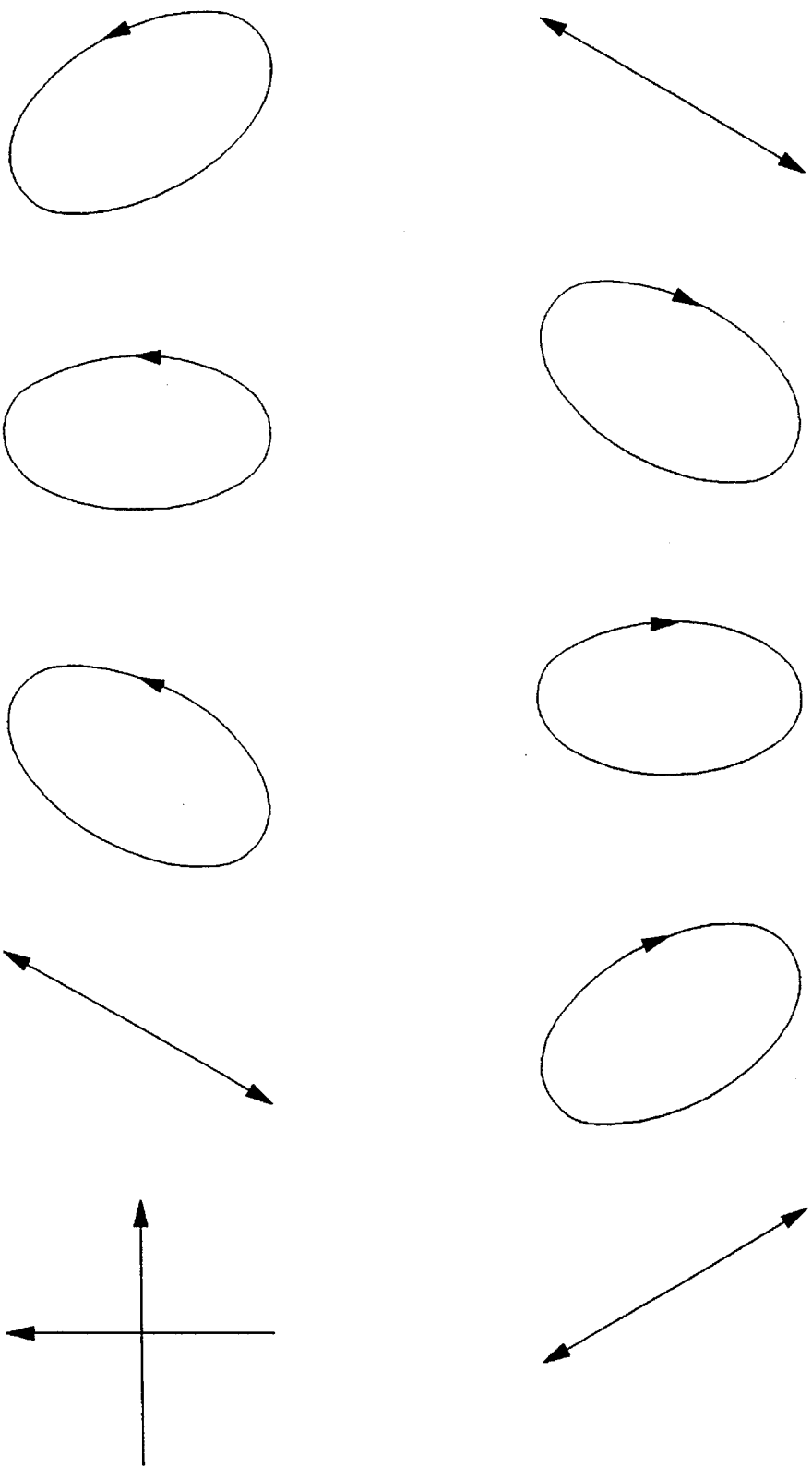
FIG. 3 shows a typical transformation of the state of polarization for an input vector not oriented along a principal axis of a uniaxial crystal.

As stated, it is desirable for certain applications to have a stable source of laser radiation with a defined and predictable state of polarization. Turning, to FIG. 1, we see the basic elements of the instant invention without the compensation for polarization transformation. The present discussion will detail the function of each element in the ring laser, with the polarization control function being discussed in conjunction with FIG. 2. Turning to FIG. 1, we see a pump laser 101 which is desirable to output light at a wavelength of either 980 nm or 1480 nm, two wavelengths corresponding multiple pump bands of the amplifying Er-doped fiber 103. A multiplexer 102 serves to mix an input signal with the amplified signal from the gain medium (Er doped fiber 103), which mixed signal then travels in the single mode fiber (SMF) 104, through an optical isolator 105. The signal at this point is then partially output via an evanescent polarization maintaining (PM) coupler 107, with the remaining signal traveling through a section of polarization maintaining fiber (PMF) to a tuning element 106 which is preferably a fiber-coupled resonant cavity, although other means of optical filtering are possible, to include for example, a fiber Fabry-Perot filter (FFP) as well as other filters known to the skilled artisan. Thereafter, the signal travels through the gain medium and about the ring. A PMF is essentially a fiber optic waveguide that is made of birefringent material and thereby has an ordinary and extraordinary axis, which are the principal axes of the *material. Accordingly, if light is introduced into this waveguide having its axis of linear polarization oriented along either of the principal axes, it will propagate through the fiber maintaining this linear polarization. If, however, the incident light is linear, for example, and of an orientation not along a principal direction, it will undergo the transformation of light polarization states from linear to elliptical to circular, and so forth. This is shown in FIG. 3. The transformation is a well known phenomena of physical optics, and the transformation from one state of polarization to another is generally equal to the beat length of the signal of light, on the order of 5 mm. Accordingly, it is critical that the light input to the PMF is of the proper orientation, along, for example, the fast axis of the device. The use of the optical anisotropy enables the incident light to remain of substantially the same orientation and polarization state. This signal traverses the ring and upon incidence to the polarizing isolator, it is of a substantially linear state of polarization. This polarizing isolator is properly oriented to be substantially in alignment with the orientation from the PMF, and polarization dependent losses are thereby minimized. The light from the isolator then is impingent on the tuning element and traverses the ring cavity. If the tuning element is chosen to be a Fabry Perot interferometer or etalon, the precision of the state of polarization is critical throughout the ring. This is due primarily to the fact that an optically anisotropic material, such as the PMF, will have a fast and slow axis. The frequency of radiation is different along each of these axes, and the peak transmission of a Fabry-Perot tuning element is sensitive to the frequency. Accordingly, it is theorized if the orientation of the state of polarization has vector components along each of these directions, there will be a combined transmission curve, and the output resolution will be less sharp than if the orientation of the light is along a principal axis. This was observed in the case of a Fiber Fabry Perot tuning element. Finally, the controllability of the state of polarization is important at the polarization maintaining coupler in order to achieve an approximately constant coupling ratio as a function of wavelength. The optical amplification needed to effect the requisite gain to achieve lasing in the ring cavity is supplied by the section of Erbium doped ($Er^{+3}$) fiber 103, however the dopant could be of other materials, to include a Er/Yb co-dopant. The pump wavelength is obviously different for different dopants, in the gain medium. The physics of such amplification is discussed presently. To effect the amplification of an optical signal in a rare earth doped fiber amplifier, the input signal to be amplified is chosen to be between 1520 and 1580 nm. This is the frequency range emitted from the stimulated emission of the coiled length of the erbium doped fiber 103. To effect stimulated emission, a signal from the pump laser 101 is chosen to be either 980 nm or 1480 nm from an appropriate source. The input signal is multiplexed with this pump signal, and then fed into the erbium doped fiber. The pump signal excites electrons in a lower energy state in the doped fiber to a higher state. In time this would effect the population inversion needed to permit lasing, in a proper laser cavity. Population inversion is achieved by pumping to excite electrons to a higher state. The electrons then decay rapidly to a metastable state (in many cases) with a longer lifetime, thereby enabling the required inversion. In an amplifier, this inversion is not utilized in the same way as in a laser, but rather is utilized to effect a more precise amplification frequency. This is clear from a consideration of Heisenberg Uncertainty, where the longer lifetime (greater uncertainty) makes the uncertainty in the energy (and hence the uncertainty in frequency) smaller. The input signal is then chosen to effect the stimulated decay of higher state electrons to a lower energy state. These quanta of light created by stimulated emission are of the same frequency and phase as the input wave, and thereby serve to amplify the input wave by constructive interference. This coherence effect is due to the coupling effect of the incident light pulse with the electrons in excited states in the doped fiber. The emitted photons are of the same direction of propagation as well. It is precisely this coherence of phase, frequency and direction of propagation that makes this kind of amplifier feasible. However, through the process of pumping and the introduction of the input signal to the erbium doped fiber, spontaneous emission occurs. Spontaneous emission of photons in the amplifying modes can adversely affect the amplification of the input signal through the introduction of noise. This noise is due to the fact that quanta of light emitted in the spontaneous emission will be of random phase and propagation direction. A small portion of this light will be captured by the erbium-doped single mode fiber, and interferes with the light emitted through stimulated emission, and reduces the overall performance of the amplifier. Clearly, it is of great importance to minimize as much as possible the spontaneous emission of light. Further details of amplification of light by the use of a rare earth doped fiber are found in U.S. Pat. No. 5,056,096, the disclosure of which is specifically incorporated herein by reference. The input signal and the amplified signal are then multiplexed by the wavelength division multiplexer 102 which may be a fused fiber WDM which preferentially combines or dichroic/reflective WDM and thereafter propagates through the single mode fiber. The signal then traverses the polarization dependent isolator, which comprises an in-line linear input polarizer followed by a Faraday rotator (for example a YIG crystal in a magnetic field of a specific orientation) which rotates the linear light by 45°, and thereafter into a linear polarizer oriented at a 45 degrees to the input. Clearly, any light which is reflected back onto the isolator will be in a state of polarization that is 90° rotated relative to the input polarizer and thereby completely blocked or absorbed by the polarizer. The wave is thereby isolated in one direction of propagation. This isolator thereby allows for a coherent source to be effected since light from the Erbium gain medium which propagates in a direction opposite the desired loop direction as well as reflection at each of the various loop components are nullified at the isolator and are unavailable to interfere with the optical field traveling in the desired direction. Tuning of the laser is effected by a filtering element, preferably a fabry perot filter 106. A good understanding of such a tuning element can be found in "PIGTAILED HIGH FINESSE TUNABLE FIBER FABRY-PEROT INTERFEROMETERS WITH LARGE, MEDIUM AND SMALL FREE SPECTRAL RANGES", Electronics Letters, Vol. 23 No. 15, Jul. 16, 1987, the disclosure of which is specifically incorporated herein by reference. The preferred finesse and free spectral range of this tuning element are, 5000 and 7,500 GHz, respectively. Accordingly, a selected wavelength band is effected by the tuning element. It is worthy to note that an FFP cannot be used as a standing wave resonator because it will reflect wavelengths outside the pass band and act as a resonator end mirror for those wavelengths in a ring cavity as in the instant invention. The isolator assures wavelength selectivity by suppressing standing wave laser modes generated by such reflections at wavelengths outside the pass band and/or of undesired polarizations. This action assures that no resonance occurs at wavelengths outside the pass band of the fabry-perot (FP) device, and lasing should only occur within the pass band of the fabry-perot (FP) device as desired. For the instant application a pass band in the range 1525–1575 nm is preferred. Finally, the signal from the FP is coupled to the polarization maintaining fiber and coupler. However, one great drawback to the device shown in FIG. 1 is its lack of control of the output polarization. When a ring laser is to be used as a source for a polarization sensitive device such as a typical modulator, its light output polarization must be linear with a fixed, known azimuth. An example of such a modulator is a LiNbO$_3$ Mach-Zender interferometric interferometer. While a single polarization fiber (SPF) or a polarization maintaining fiber (PMF) can be used to effect such a fixed polarization state, the required components of the ring laser are either not available in or are impractical to make in SPF or PMF. As a result, part of the ring still uses standard single mode fiber (SMF), and in a ring segment over which the polarization is not controlled by the fiber type (from POINT A TO POINT B in the counter-clockwise direction), the polarization is subject to change and its polarization state is transformed as is indicated. As described above, uncontrolled polarization states will result in an undesireable, time and wavelength varying polarization dependent loss at the output of the polarizing isolator. The polarization controlled output is effected as follows. Turning to FIG. 2, a coiled section 207 of SMF serves as a polarization compensator as is explained presently. The coiled section will induce mechanical stresses on the fiber of the coil. The compression or tension in the material results in the material's taking on the properties of a negative uniaxial or positive uniaxial crystal, respectively. This phenomena is commonly known in the art as mechanical or stress birefringence or as photoelasticity. In either event, a negative or positive uniaxial crystal, the effective optic axis is in the direction of the stress and the induced birefringence is proportional to the stress. Clearly, if the stress is not uniform over the material, neither will the birefringence nor the retardance imposed on the transmitted wave. In our application, the desired effect is to effect a rotation of the linearly polarized light by virtue of this birefringence so that after the signal traverses the various components of the ring, it shall emerge at the output linearly polarized with a fixed, known azimuth. It is of importance to note that the location in the ring of this section 207 could be at any point in the SMF section of the ring and could even be located in the section of doped fiber. This rotation of the azimuth at POINT B will minimize polarization dependent loss at the polarizing isolator, as well as to minimize the PDL variability. PDL at this point is a function of the angle between the polarization vector and the transmitting polarization vector of the polarizing isolator. The linear polarization at Point B is rotated to a favored orientation by twisting the SMF, which causes rotation of the linear polarization vector in proportion to the twist rate of the SMF. This polarization orientation is fixed by fusing the twisted fiber in the construction of the ring. By minimizing the extent of SMF fiber in the ring, a robust and stable polarization condition is effected at Point B, resulting in stable laser power output over time. Because the compensation of the unavoidable birefringence of the various components is achieved with the same material, the correction for birefringence is wavelength independent. As a result, the device achieves the desired stable polarization output in the desired range of wavelength, 1525–1575 nm.

It is of interest to note that the final ring configuration depends on whether PMF or SPF is used. By using SPF, which acts as a linear polarizer, a polarizer is not required in the isolator, reducing the complexity and the cost of the device. Currently the preferred embodiment utilizes PMF, because existing SPF exhibits undesirable sensitivity to bending and also, to achieve good extinction ratio, requires fiber length in excess of that desired. By using the PMF, the light coupled out of the ring has a unique, controlled linear polarization. Accordingly, the ring output may be deployed without regard to the effects of polarization relative to SMF as above described. Such a source is useful as a source as a continuous wave source as well as in other applications previously mentioned.

The desired polarization controllable tuneable ring laser is effected through polarization compensation and control at the various points mentioned throughout the disclosure of the invention. It is clearly understandable that the various components used in the ring laser are potentially subject to compatible substitution. To the extent that such modification is within the purview of the skilled artisan, these are considered within the theme and spirit of the claimed invention.

We claim:

1. A controlled polarization, tuneable ring laser, comprising:

(a) A source for optical pumping coupled to means for multiplexing light signals;

(b) A section of fiber twisted to induce a selected amount of birefringence in said section of twisted fiber connected to said means for multiplexing light signals;

(c) A first segment of optical fiber connecting said section of twisted fiber to a polarizing optical isolator polarizer;

(d) Means for optically selecting a mode of light traveling in said ring laser to a selected bandwidth connected to said polarizing optical isolator, said means for tuning light connected to an output coupler; and (e) A second segment of optical fiber connected to said output coupler, said second further connected to a section of doped optical fiber, said doped fiber further connected to said multiplexer, thereby completing a laser ring cavity.

2. A ring laser as recited in claim 1, wherein said doped optical fiber is doped with $Er^{+3}$, and serves to amplify said light traveling in said ring laser.

3. A ring laser as recited in claim 2, light input from said input source is pump energy light of a wavelength of 980 nm or 1480 nm.

4. A ring laser as recited in claim 1, wherein said first segment of optical fiber is single mode optical fiber.

5. A ring laser as recited in claim 1, wherein said second segment of optical fiber is polarization maintaining fiber.

6. A ring laser as recited in claim 1, wherein said polarizing optical isolator is a magneto-optic isolator coupled to selected light polarizers.

\* \* \* \* \*